March 1, 1966 D. SHAPIRO ETAL 3,238,505

INFORMATION HANDLING APPARATUS

Filed April 21, 1961 4 Sheets-Sheet 1

INVENTORS
WILLIAM G. DALY, Jr.
DAVID SHAPIRO
HARRY G. WILLIAMS
BY Henry L. Hanson
ATTORNEY

INFORMATION HANDLING APPARATUS

INVENTORS.
WILLIAM G. DALY Jr.
DAVID SHAPIRO
HARRY G. WILLIAMS
BY
ATTORNEY

March 1, 1966 D. SHAPIRO ETAL 3,238,505

INFORMATION HANDLING APPARATUS

Filed April 21, 1961 4 Sheets-Sheet 3

INVENTORS.
WILLIAM G. DALY Jr.
DAVID SHAPIRO
HARRY G. WILLIAMS
BY
ATTORNEY

INVENTORS.
WILLIAM G. DALY Jr.
DAVID SHAPIRO
HARRY G. WILLIAMS
BY Henry L. Hanson
ATTORNEY 3,238,505

INFORMATION HANDLING APPARATUS

David Shapiro, Watertown, and William G. Daly, Jr., Belmont, Mass., and Harry G. Williams, Tampa, Fla., assignors to Honeywell Inc., a corporation of Delaware

Filed Apr. 21, 1961, Ser. No. 104,691

7 Claims. (Cl. 340—172.5)

A general object of the present invention is to provide a new and improved apparatus for effecting manual control of a data processor. More specifically, the present invention is concerned with a new and improved manual control for a data processor which is characterized by the simplicity of the manual controls in terms of ease of operation coupled with protective features which ensure that the manual controls are being used properly.

Data processing systems of the variable program type generally have associated with the system some type of manual control whereby it is possible to direct the operation of the system, write information into the system, query selected operations of the system, and otherwise monitor and control the system. Many of the manual control facilities or consoles associated with data processing systems have been extremely complex with vast numbers of switches, indicator lights, and the like provided for purposes of control and monitoring the associated system. The operation of these manual controls has proved to be difficult for many system operators and the incidence of error associated with the manual control and monitoring has proved to be extremely expensive in terms of data processing time lost as a result of such errors.

In accordance with the teachings of the present invention, a new and improved control console has been provided wherein the heart of the control for the manual operator is a typewriter-type keyboard which may be conveniently arranged in the standard keyboard format. Associated with this typewriter keyboard are a very limited number of control switches which may be used in carrying out the manual controls desired at the console. The control circuits associated with the console have been so arranged that a manual operator may effect substantially all control of the associated data processing system by way of the keyboard and the proper selection of the keys associated therewith. Thus, for example, should an operator desire to write something into a particular section of the data processing system, he may operate a selected control key on the keyboard to specify a write order. The operator may then select the format of the data which is to be written by actuating a further key on the keyboard. Similarly, the operator may then type by way of the keyboard the address where the data is to be written and then the actual data which is to be written. As each individual key is operated, an encoding of the character associated with that key is effected and the encoded result, or its equivalent, is stored until all of the operations with respect to the particular console order have been selected. As each encoded character is stored, there is a feedback of the stored signal to a printing station which effects a visual printing of the character actually selected. This ensures that the operator will see that the code which was actually selected by way of the selection key was encoded in the desired manner to produce the desired character for operating and/or inserting into the data processing system.

It is accordingly a further more specific object of the present invention to provide a new and improved control apparatus for data processing systems wherein individual character selections made on a console or control keyboard are encoded and stored with signals representing the stored results being fed back to a printing station to effect the desired printing operation immediately following the selection of a particular character at the keyboard.

Inasmuch as the control apparatus or console for the data processing system is required to perform certain programmable or variably selectable orders, it is essential that means be provided for selecting the orders which may be uniquely associated with the control apparatus. Typical orders associated with such a control apparatus or console are the manual write order and the manual print order. For an operator to select one of these orders, an appropriate control signal or signals must be generated which will peculiarly identify the order to be performed. As implemented in the present invention, the write order may be specified by a character W on the keyboard, while the print order may be specified by the character P on the keyboard. Thus, the operator desiring to perform a write operation by way of the console need but operate the W key on the keyboard at the appropriate time. Also, the manner in which the data to be written is subsequently encoded must be variably accounted for in order to handle different forms of information coding, such as octal, hexadecimal or alpha-numeric. As further taught by the present invention, the selection of the format for the data to be manipulated may also be effected directly by way of an appropriate character selection at the keyboard such that the selection of the O key will establish the octal format, the operation of the H key will establish the hexadecimal format and the operation of the A key will establish the selection of the alpha-numeric format.

A still further object of the invention is then to provide a new and improved control apparatus for data processing systems wherein a plurality of character keys on a typewriter-type keyboard may be selectively activated for selecting a control order for the console or control apparatus as well as the format of data to be manipulated by the control apparatus or console.

Having thus simplified the manner in which an operator may select a control order as well as format, it is essential to ensure than an error in key selection at the keyboard is not allowed to set up erroneous control data in the circuitry. Thus, provision is made, in accordance with the teachings of the invention, to protect against an erroneous character selection as an operator is establishing the necessary control data for the data processing system.

It is therefore a still further object of the present invention to provide a control apparatus for a data processing system in the form of a manually operable keyboard having a plurality of character selection keys thereon wherein selected keys may be operated for establishing predetermined control orders and other related control data, and wherein means are provided to prevent or lock out an illegal character selection.

Another protective feature of the present invention relates to the ability of an operator to selectively cancel out data which may have been erroneously typed or set up by way of the console. The data typed by way of the console may be considered in two separate categories, one category being control data and the other category being informational data. If an error is made while the data is being typed for the control, the operation of a cancel switch may be used to effect the cancellation of all of the control data. In the event that the operator has proceeded with the typing of the control data and is typing or finishing the informational data, he may eliminate informational data by actuating the cancel switch and the control data will not be affected. However, a second operation of the cancel switch may then be used to eliminate the control data as well.

It is therefore a still further object of the invention to provide a new and improved facility for a data processing system control apparatus wherein the data being supplied to the data processing system may be selectively eliminated in accordance with whether the data is control data or informational data by the operation of appropriate cancel control means.

Another feature of the invention relates to the organization of the control apparatus wherein at least two specific operations must be performed by a manual operator before a control action will take place in the associated data processing system. Thus, in connection with writing information into the data processing system by way of the control apparatus or console, the operator must type the necessary control data as well as informational data. After the necessary key selections have been made by the operator, a control indicator will become operative to condition the control apparatus for execution of the order upon the further operation of associated switch means by the operator.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
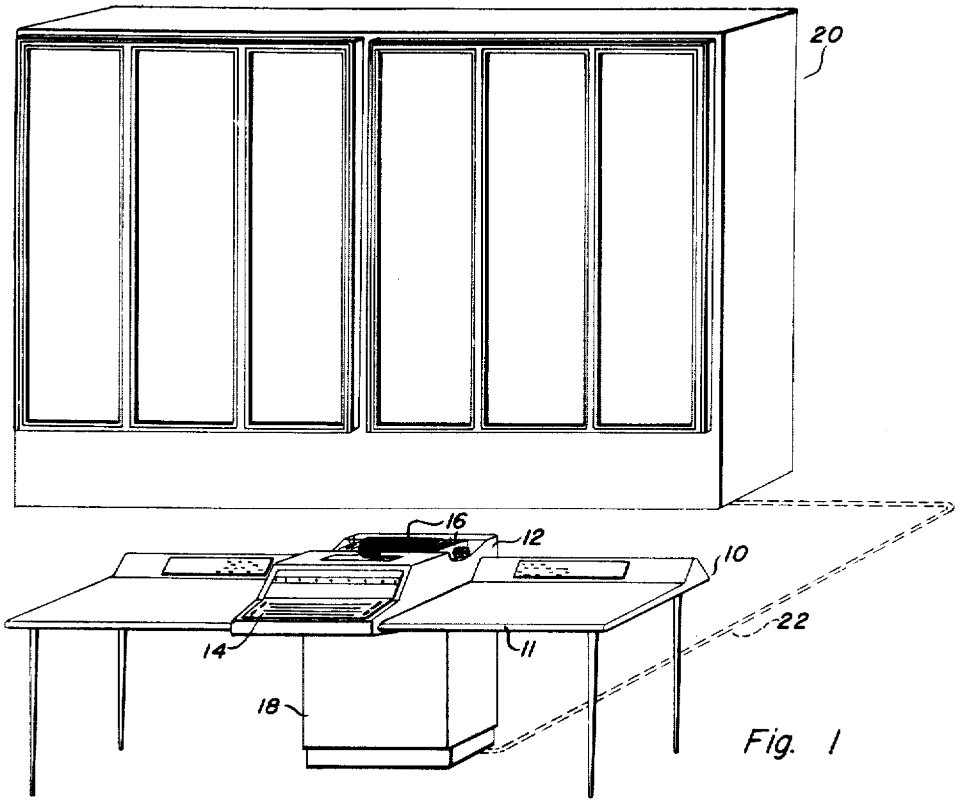
FIGURE 1 is an illustration of apparatus incorporating the present invention as it may be applied to a data processing system.

Referring first to FIGURE 1, the numeral 10 identifies a data processing system control console which includes a support table 11 on which is mounted a control station 12 which comprises a keyboard selection unit 14 and a typing or printing station 16. The console 10 is arranged to have the circuitry which may be located in a console control section 18 coupled to a central processor unit 20 by way of a coupling means indicated generally at 22. The central processor 20 may well be arranged to incorporate the basic elements of a high-speed memory, an accumulator which includes appropriate adding and arithmetic accumulating circuitry, and a plurality of registers which are adapted to be associated with both the control functions and storage functions normally required in a central processor of a data processing system. A central processor incorporating the basic registers and accumulating circuit which could be used with the present invention is illustrated and described in the copending application of Henry W. Schrimpf, bearing Serial Number 636,256, dated January 25, 1957.

A general function of the control console in its association with the data processing system is to provide a means for manually controlling the data processor. Thus, the data processor must be capable of being started and stopped by way of the control console. The console must further be provided with means to enter data into the central processor by way of the console as well as to receive data from the central processor which should be typed or printed at the console for purposes of aiding the operator in the over-all control of the data processor. Thus, an operator sitting at the console 10 may wish to write something into a selected memory location in the central processor. The operator would do this by actuating the appropriate control keys on the keyboard 14 to define the appropriate order to be performed, the format of the order, the address to which the data to be inserted is to be written, and then the data which is to be written. Having appropriately entered the data by way of the console, a further control is actuated at the console so that the data will be transferred to the proper location within the central processor 20. In order that the operator be aware of when information is actually going into the central processor, as well as the instructions for inserting this data, it is necessary that the typewriter type those steps which are actually being called for by the operator as he is entering the control data and information, by way of the console.

Figure 2:
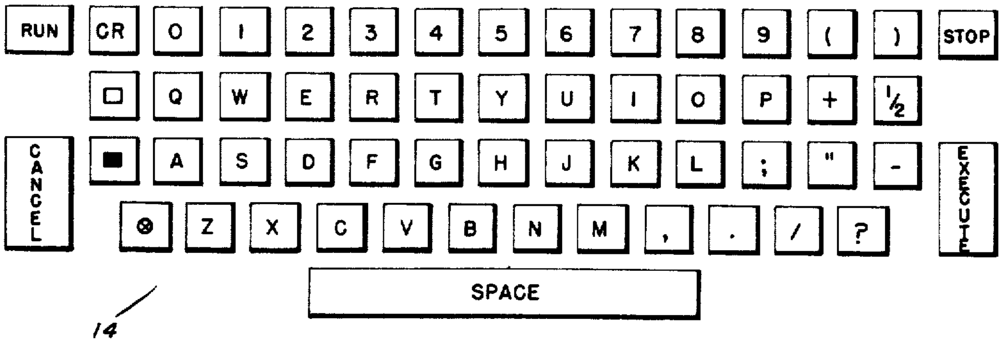
FIGURE 2 illustrates a preferred form of keyboard arrangement to be used with the present invention.

The selection and control keys on the keyboard 14 of the console 10 may be arranged in the manner indicated generally in FIGURE 2. It will be noted that the keys on the keyboard are arranged in the general format of typewriter keys as found on a standard keyboard. As illustrated, the keyboard includes the twenty-six letters of the alphabet, as well as a "cancel" and an "execute" control actuator. As taught by the present invention, the only keys which need be actuated at the console are those keys located on the keyboard 14. Thus, the console operator can, by following a prescribed sequence of operations, direct the entire operation of the data processor by way of the keyboard.

In a preferred embodiment of the invention the prescribed sequence of operation of the keys on the keyboard for performance of an order involved the following:

1. Select a key representing an order;
2. Select a key representing data format;
3. Select keys representing an address designation, as well as the address;
4. If data is to be inserted into the central processor, select data by way of the selection keys;
5. Actuate the "execute" key so that the console-initiated order will be performed.

Typical of the orders which may be executed by way of the console are the orders of manual write and manual print. The write order may be selected at the console by way of the selection key W. Similarly, the print order may be selected by the operator by way of the selection key P. Obviously, the extent to which control orders are provided will be dependent upon the type of central processor with which the console unit is adapted to be associated, as well as the extent to which it is desired that manual control be provided by way of console-directed orders.

In connection with the printing and writing orders, the selection of format, as noted above, is by way of the second key stroke. In the preferred embodiment of the invention, the format was arranged in three different ways, octal, hexadecimal, and alpha-numeric.

Figure 3:
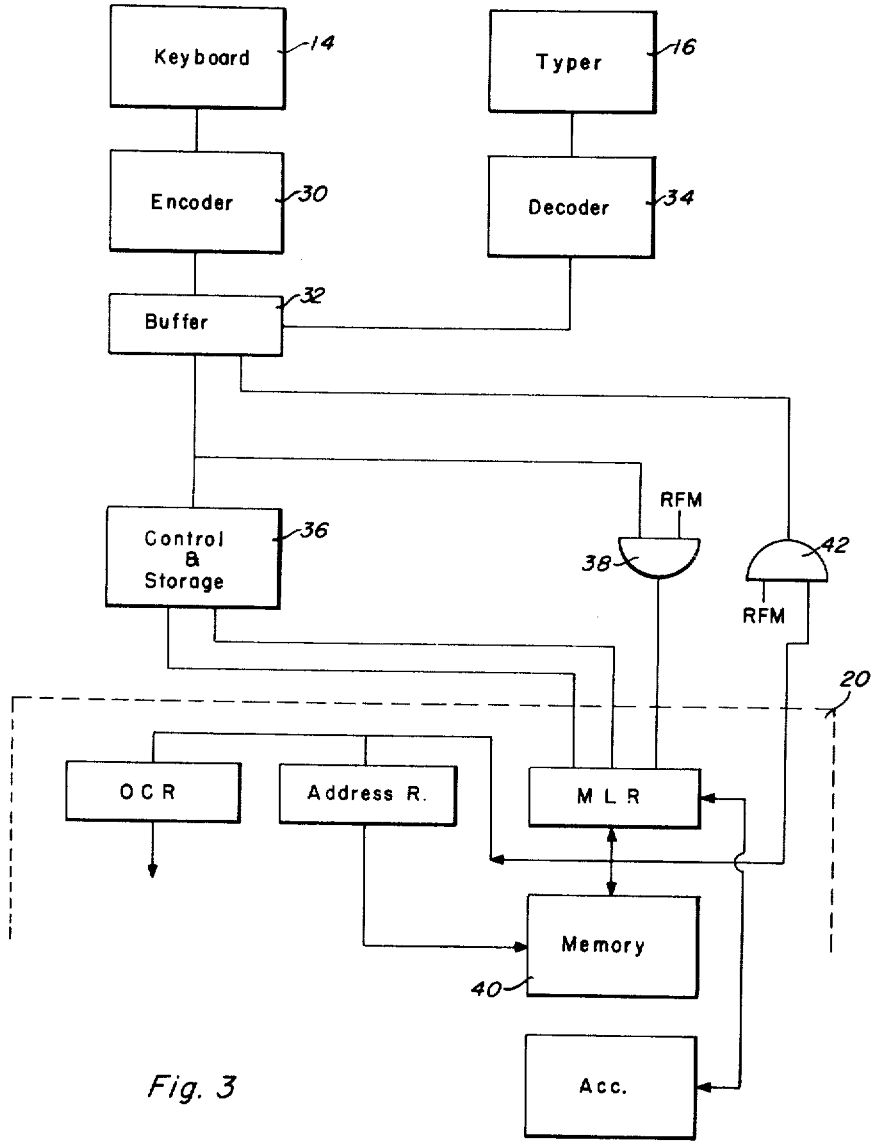
FIGURE 3 illustrates diagrammatically the arrangement of the principal parts of the apparatus associated with the invention.

Referring next to FIGURE 3, the keyboard 14 and typer 16, described above, are shown in their arrangement with respect to the control and transfer circuits used in implementing the present invention. Associated with the keyboard 14 is an encoder 30 which is adapted to encode the key selections made on the keyboard 14 and produce on the output thereof a six-bit code which is temporarily inserted in a buffer circuit 32. The buffer 32 is arranged to communicate with a decoder 34, the latter of which is adapted to receive the six-bit code from the buffer 32 and provide appropriate output signals for activating the typer 16, the latter of which may take the form of a conventional electric typewriter mechanism using actuating solenoids individually selected in accordance with the decoding signals derived from the output of the decoder 34.

The buffer 32 also communicates with a control and storage section 36 which is adapted to store and keep track of the status of the key selections at the console so that control orders, format, address information, and the like will be appropriately directed as it is selected by way of the keyboard 14. The buffer 32 is also arranged to communicate through appropriate gating circuitry with the central processor 20. The gating circuitry illustrated generally at 38 is adapted to be opened upon the generation of a ready-for-a-memory signal RFM.

The central processor 20 may well incorporate a series of control registers such as a memory local register MLR, an address register, and an order control register OCR. The memory local register MLR and the address register are adapted to respectively communicate with selected memory locations within a memory unit 40 at an address location specified by the address data stored in the address register. The memory local register MLR also serves to provide for the transfer of control data from the circuitry 36 to the control register OCR and the address register. An accumulator ACC is also connected to communicate with the memory local register MLR.

Data from the memory local register MLR is arranged to be fed back by way of a further gating circuit 42 to the buffer 32. The gating circuit 42 is arranged to be opened under conditions including the presence of a ready-for-memory signal RFM.

The general operation of the circuit of FIGURE 3 may be understood by noting that an operator will normally operate the keyboard 14 and actuate a plurality of keys in the manner outlined above. Each key stroke selects a particular electrical circuit which, by way of the encoder 30, results in a six-bit code being dropped into the buffer 32. The order-defining bits from the buffer 32, the format-defining bits from the buffer 32 and the address-defining bits from the buffer 32 are all arranged to be stored in the control and storage section 36 of the console. If information is to be inserted into the memory 40, the bits relating to the order will indicate that information is to be inserted into the memory so that the RFM signal will be present. Consequently, data from the buffer 32 may now be gated into the memory local register MLR in the central processor 20.

As contemplated by the present invention, instead of using a further storage register in the console for information to be inserted, the information coming in from the buffer to the memory local register is inserted into a specified console memory location which is related to the console order being performed. As the data comes into the memory local register, it is inserted into this special console memory location. The number of bits that will be inserted with each key stroke will, of course, be dependent upon the format specified by the operator. If the format is octal, three bits will be inserted. If the format is hexadecimal, four bits will be inserted, while if the format is alpha-numeric, six bits will be inserted. In one embodiment of the invention, a word of information was defined in terms of 48 information bits. Consequently, if the octal format is being used, it will take 16 key strokes in order to define a full word of information formed of 48 bits. Similarly, 12 key strokes will be required if the format is hexadecimal, and eight key strokes will be required if the format is alpha-numeric.

In order to utilize the memory location for the storage of a complete word, each key stroke is effective to not only insert new bits of information into the memory local register but also to activate circuits whereby the specified console memory location is read out into the accumulator and the incoming bits are added to the shifted result stored into the accumulator. The resultant word stored in the accumulator is then inserted back into the specified console memory location. Thus, after the requisite number of key strokes have been actuated by the operator, a complete word of information will reside in the specified console memory location.

After the desired information has been inserted into the specified console memory location, the operator will actuate an "EXECUTE" button at the console and this will in turn initiate the completion of the order called for by sensing the address stored in the control and storage circuits 36 and then transferring the word stored at the specified console memory location to the memory location as specified by the address typed by the operator.

As each key stroke is effected by the operator at the keyboard 14, the resultant information passing to the buffer 32 will also be applied to the decoder 34 which, in turn, will activate the typer 16. In the case of control data and address data which may be stored at 36 in the console, the information passing through the buffer 32 will go directly to the decoder 34. In the case of information being inserted into the memory 40, the bits inserted into the memory local register will be examined and fed back through the buffer 32 to the decoder 34. It will be apparent that in this manner it is possible to monitor accurately the actual bit configurations being manipulated by the data processor. This assures the operator that what has been encoded by the operator's key selection and what has been manipulated agrees with what actually has been typed by the typer 16.

Figure 4:
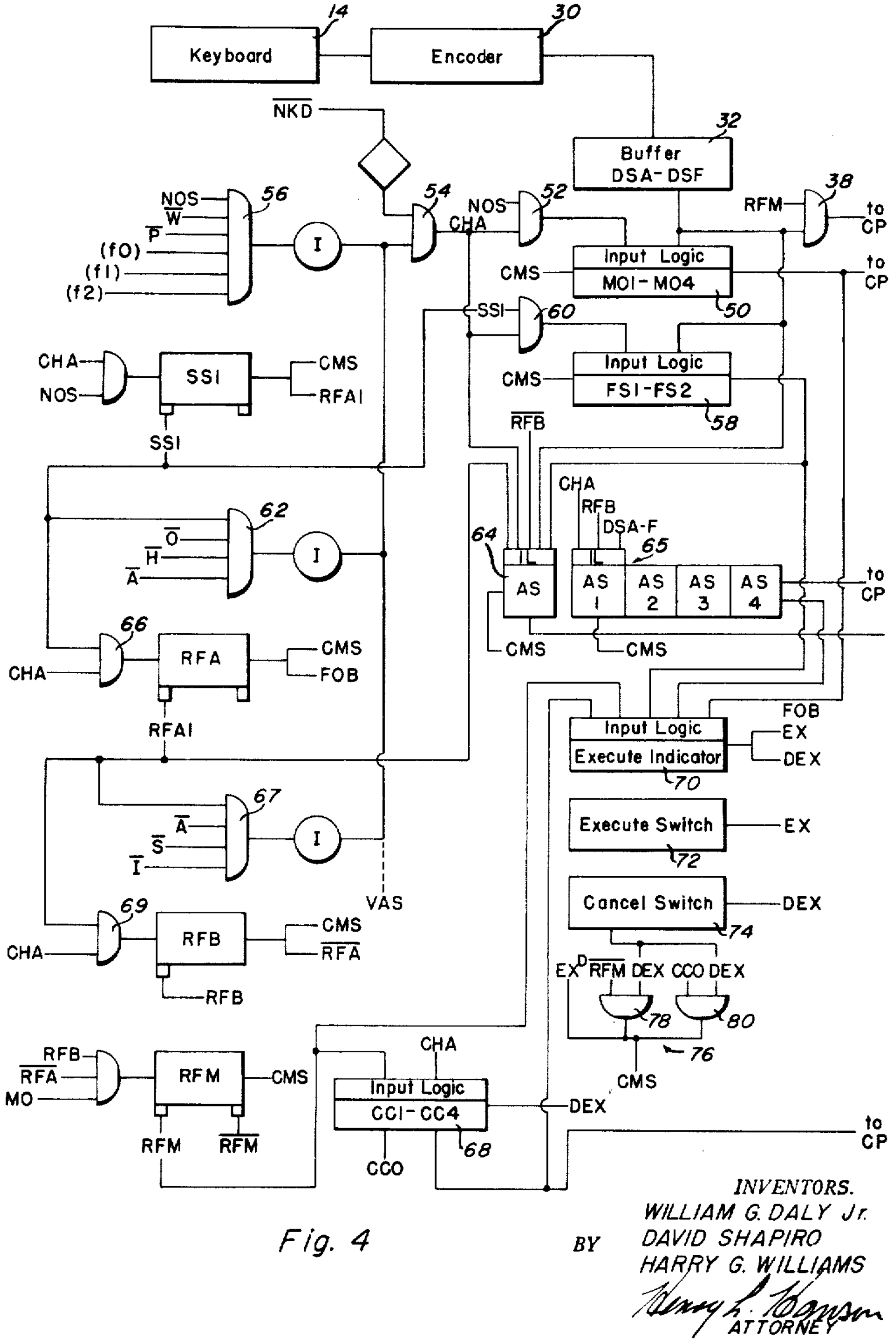
FIGURE 4 illustrates the basic logical circuitry associated with the invention.

Referring next to FIGURE 4, there is here illustrated the elemental logic associated with the control and storage circuitry 36 referred to in FIGURE 3.

The glossary of terms used in connection with FIGURE 4 is tabulated below:

*Table A*

NOS=No order stored
NKD=No key down
RFM=Ready for memory
RFA=Ready for address
DS=Digit storage
FS=Format storage
AS=Address storage
EX=Execute
DEX=Cancel (don't execute)
CR=Control register
AR=Address register
CMS=Cancel manual storage
W=Write order
P=Print order
MO=Manual order
CC=Console counter The storage of the manual orders originating at the console is effected by way of a register 50. This register may well take the form of four bistable flip-flops identified as MO1 to MO4. The circuits MO1 to MO4 are so arranged on the input logic that upon the first key stroke by the operator on the keyboard 14, the MO circuits will be set in accordance with a predetermined code representing the particular key stroke which was made. By definition in the present invention, the selection of the console order key W will result in the following setting of the MO flops: $\overline{MO1}\cdot\overline{MO2}\cdot MO3\cdot MO4$. Selection of the console order key P will result in the setting of the MO flops as follows: $MO1\cdot\overline{MO2}\cdot\overline{MO3}\cdot\overline{MO4}$.

The input logic for these circuits is so arranged that the key stroke data, as encoded by the encoder 30, passes through the buffer 32 to the input logic. However, the MO circuits will not be set until an appropriate gating pulse is applied by way of a gating circuit 52, the latter having as one input signal a "no order stored" signal NOS and a CHA signal indicating that a proper key related to a valid console order has been selected at the keyboard 14. This latter signal is supplied by way of a further gating circuit 54 having two input gate legs, one of which indicates that a key has been operated on the keyboard 14 and has produced the $\overline{NKD}$ signal. The other input gate leg is arranged to be activated when selected keys at the keyboard 14 have been operated as indicated by a valid character checking gate 56. The functions on the input of the gate 56 are so arranged that when there is a "no order stored" condition NOS on one of the input gate legs, the actuation of any valid order character, such as a W or a P, will create an output signal which will be fed to one of the input gate legs of the gate 54. If an invalid character is struck, said character being defined as one which is not representative of a valid console order, then the gate 54 will remain closed so that the character coming in from the buffer 32 cannot be inserted into the MO register 50.

A format storage circuit 58 is also provided and this may well take the form of a pair of bistable flip-flops FS1 and FS2 having appropriate input logic. The input logic is arranged to receive encoded bits passed through the buffer 32 as well as an appropriate timing pulse indicating that a valid format key has been selected at the keyboard 14. This latter signal is derived by way of a gating circuit 60 having one gate leg connected to receive the signals CHA from the gate 54 and a further input signal indicating that the sub-state 1 condition is active as indicated by the sub-state SS1 flip-flop being in the set condition. This flip-flop will be in the set condition as soon as any one or more of the manual order flip-flops in the register 50 have been set as indicated by the presence of an NOS signal and a CHA signal. The proper format key selection is checked by way of the checking gate 62. By definition, in one embodiment of the invention, the octal format was defined by a setting of the FS flip-flops as follows: $\overline{FS1}\cdot FS2$. The setting of the FS flops for hexadecimal format was $FS1\cdot FS2$. The setting of the FS flops for the alpha-numeric format was $FS1\cdot\overline{FS2}$.

An address designator register 64 is also provided. The input logic is arranged so that the designator bits from the buffer 32 may be inserted into AS when the signal CHA is present and the RFA signal is present. The remaining portion of the address may be stored in the address stages AS1 to AS4, indicated generally at 65. The gating of the signals into the section AS will be under the control of the "ready-for-address" flip-flop RFA. The latter flip-flop is adapted to be set by way of the input control gate 66 which has one input derived from the sub-state flip-flop SS1 and a key selection signal CHA indicating that a signal has been selected for insertion into the buffer 32. By definition, in the preferred embodiment, the four bits inserted into the register 64 may take the form of address designator bits to define an absolute address selected by the key A, a special address selected by the key S, or an indexed address selected by the key I. These signals are adapted to be supplied by way of a further gating circuit 67 having inputs from the appropriate selection keys at the keyboard 14, as well as an input from the "ready-for-address" circuit RFA.

Each of the address storage sections AS1 to AS4 may be comprised of three separate bistable flip-flops arranged to operate as a serial shift register so that the data for the address may be inserted in section AS1 and shifted along until a lead bit is shifted out of the last stage of AS4. This latter bit may be termed a fall-out bit FOB.

A similar address control circuit RFB is also provided for activating the input logic for the register 65 as four additional address selection keys are selected by way of the keyboard 14. A "valid address selection" signal VAS may be generated in the manner indicated for the gating circuit 67 with the appropriate address keys, generally numeric, being activated to produce the address signals. The first key stroke for AS1 will insert therewith the aforementioned fall-out bit.

After the address designator bits and the address identification bits have been inserted into the registers 64 and 65, the "ready-for-memory" flip-flop RFM will be switched to the set state provided that the manual order selector is one calling for the insertion of data into the memory. With the "ready-for-memory" flip-flop RFM in the set state, the console counter 68 will be conditioned to start counting the key strokes relating to the entry of data in the central processor memory. Inasmuch as 16 key strokes are required in order to load 48 bits of octal information, it is necessary that the console counter 68 be at least a mod 16 counter incorporating four counting stages CC1 to CC4.

The output of the console counter 68 is arranged to be connected to the input logic of an execute indicator circuit 70. The execute indicator may well take the form of a bistable circuit having appropriate input logic to activate the execute indicator in accordance with the particular console order being performed as well as the data associated with format and the setting of the console counter. In connection with a write order, for example, the logic for setting the execute indicator may be as expressed in the following Boolean statement:

$$CC1\cdot CC2\cdot CC3\cdot CC4\cdot MO3\cdot MO4\cdot\overline{FS1}\cdot FS2$$

The execute indicator 70 may be arranged to be reset when the execute switch 72 is activated or the cancel switch 74 is actuated.

In order that an operator be able to eliminate an error made in activating the selection keys at the keyboard 14, the cancel switch 74 is provided. The cancel switch 74 is so arranged that if it is actuated before information has started to be inserted into the central processor memory, the storage circuits for the manual order, the format and the address will all be reset by the "clear manual storage" signal CMS. The signal is generated by the circuitry indicated at 76. The circuit will be seen to comprise a pair of gating circuits 78 and 80. The gate 78 is adapted to be opened to produce the "clear manual storage" signal CMS when the cancel switch 74 is activated and the "ready-for-memory" flip-flop RFM is reset as indicated by the signal $\overline{RFM}$. The gate 80 is provided with a pair of inputs, one of which is activated by a DEX signal under the control of the cancel switch 74 and the other of which is activated when the console counter is set to the zero state, as indicated by the signal CC0. This further gate is provided in order that the clear manual storage signal can be generated after all of the console storage circuits have been set and prior to the time that information has been inserted into the memory. The "clear manual storage" signal CMS is also adapted to be generated when the execute switch 72 has been actuated.

The over-all operation of the apparatus illustrated in FIGURE 4 will best be understood by reference to a specific operation. The operation to be described is the performance of a "write" order. It is first assumed that the console circuits are in the clear condition so that all of the storage circuits are in the reset state. To select a "write" order, the operator will depress the W key on the keyboard 14. The selection of the W key will be encoded by the encoder 30 and the six-bit code will be transferred to the buffer 32. The buffer 32 is arranged to be examined by the input logic to the register 50. The input logic to the register 50 will not set the MO circuits until such time as a valid character signal has been received by way of the gate 56, gate 54, and gate 52. At this instant, the MO register circuits will be set. By definition, it may be assumed that of the four register circuits MO1 through MO4, only circuits MO3 and MO4 will be switched to the set state to define thereby the "write" order.

The next key stroke will be the format key stroke. It is assumed in this instance that an octal format is desired and therefore the operator will strike the O key on the keyboard 14. This key stroke will be encoded by way of the encoder 30 and is again applied to the buffer 32. The output of the buffer in this instance will be interpreted by the input logic of the format storage register 58, when the logic is activated by the input signal derived by way of the gate 60, gate 54, and gate 62, indicating that a valid format key has been struck.

The next step performed by the operator will be to select the designator bits for the address. It is assumed here that an absolute address is selected, the absolute address being an address of the main memory of the associated processor. Consequently, the key stroke A will be encoded by encoder 30 and inserted into the buffer 32.

From there, the data will be transferred into the input logic of the address storage section AS, when this input logic has been appropriately gated by a signal indicating a valid key selection, a signal indicating that the circuitry is ready for an address as indicated by the signal RFB. The next key selection will start to define the numerical portion of the absolute address in the form of three bits. The first three bits of the address will pass by way of the buffer 32 into the input logic for the address register 65 at section AS1. Once inserted, the contents of the address register are shifted to the right so that the initial address bits will now reside in address storage section AS2 and the next three bits of the address may be inserted in AS1. The operator will actuate three further keys defining the remaining bits of the address so that these bits will also be inserted into the address register. Thus, in the shifting and inserting process, all of the circuits of the register sections will be set to the desired address defining state. At this time, the "ready-for-memory" circuit RFM is switched to the set state and this will condition the circuit for the insertion of information. The setting of the RFM circuit will originate from the fall-out bit, resetting $\overline{RFA}$ so that RFA and RFB will be active at the same time on the set gate of the RFM circuit.

As the first key for the information is struck, this will be encoded and inserted into the buffer 32 where it is ready to be fed out through the gate 38 to the central processor. The setting of the circuits of the buffer along with the presence of a "ready-for-memory" signal RFM may be used to signal the central processor that the console has information coming in. The setting of the manual order circuits 50 will be interpreted by the central processor by way of the memory local register MLR and then the order control register OCR so that when the central processor is ready to take information from the console, a transfer order will be performed with respect to the contents of a specified console memory location in the memory 40, shown in FIGURE 3. The data therein will be read out into the accumulator and the incoming information bits from the buffer 32 will be dropped into the accumulator to be combined with the information already residing there. On the first key stroke, this information in the specified memory location will be cleared to zero so that, with an octal format, three bits of information will be inserted into the word location and then drop back into the predetermined memory location assigned to the console. Upon the next information key stroke being made, the word in memory will be once again transferred into the accumulator where it will be shifted and the new incoming three bits of octal information will be inserted into the word. This operation will continue until the operator has operated 16 keys to define a complete word of 48 bits.

The transfer order which is performed by the central processor will be generated by an appropriate interpretation of the console storage circuits. For example, the transfer order may be generated when the following Boolean statement is met: $\overline{EX}\cdot RFM\cdot\overline{NKD}\cdot MO3\cdot MO4$. When the console takes over the central processor, this transfer order will be inserted into the order control register OCR by way of the memory local register to effect the operation called for above.

After 16 information keys have been operated on the keyboard 14, the console counter 68 will have all of the counter stages thereof in the set state and this will be applied to the input logic of the execute indicator 70. With a "write" order and with the octal format selected, the input logic will activate the execute indicator 70 to signal the operator that he may now operate the execute switch 72. When the execute switch is operated, the console will again be put in a demand condition and the manual order register 50 will be examined within the central processor to set up a transfer order which will transfer the contents of the assigned console memory location to a location specified by the address bits supplied to the central processor by way of the address storage circuits 64 and 65. Upon the actuation of the execute switch, the "clear manual storage" signal will be created to clear all of the storage registers in the console circuits in preparation for the next operation to be performed by way of the console.

In the event that the operator detected an error in his typing and as the result thereof was printed by the typer 16, or an error condition was indicated whereby there was a difference between the key selected and the information printed by the typer 16, the operator can void the information or the control data by actuating the cancel switch. If the operator has typed any information which has been directed to the memory system, the actuation of the cancel switch will cancel only the information which has been inserted into the memory and this cancelling is effected by the resetting of the console counter 68 by the DEX signal. A further typing of information then will cause the new information to be inserted in the specified console memory location. If the operator desires to cancel both information and control data, he will strike the cancel switch 74 twice. First actuation of the cancel switch will reset the console counters 68 to zero, and the second striking of the cancel switch will create the "clear manual storage" signal by way of the circuitry 76 to thereby reset all of the storage circuits within the console.

If the operator desires to perform a manual print order, the same general sequence of operations must take place as described above in connection with the write order. That is, the operator must specify by way of the keyboard that the order to be performed is a print order and he may do so by striking the key P. The operator must then specify the format in which the data to be printed is to be interpreted. This is accomplished by the selection of the format key on the second key stroke. Next, the operator must select the address of the data storage location from which the data to be printed is to be derived. As soon as the operator has finished typing the address, the fall-out bit FOB will combine with the signals from the manual order register 50 to set the execute indicator 70 to inform the operator that he may, if he now desires, actuate the execute switch 72. The control data, upon the actuation of the execute switch 72, will be effective to transfer the specified order directions from the manual order register 50 and the address register 64 by way of the MLR to the order control register OCR so that upon the console demand condition being recognized by the central processor, the data specified will be transferred to the console memory location in the main memory. The order selected will, in addition to the transferring, effect the necessary cycling of the data out of the console memory location through the accumulator so that the data may be read out and shifted for subsequent readout to the console.

The manner in which the console control circuits are actually coupled to the central processor will, of course, depend upon the type of central processor with which the console is associated. In a copending application of Henry W. Schrimpf bearing Serial Number 754,253, filed August 11, 1958 now issued Patent No. 3,029,414, assigned to the assignee of the present application, there is disclosed an apparatus for controlling a central processor so that it may perform a plurality of programs in parallel. The control of the central processor as well as the control of the peripheral devices associated therewith is by way of a pair of traffic control circuits which are arranged to recognize when certain demand conditions exist at the peripheral devices, or within the separate programs, so that the central processor may be arranged to step through the various programs and peripheral device operations that are necessary in order to carry out the desired programs.

Figure 5:
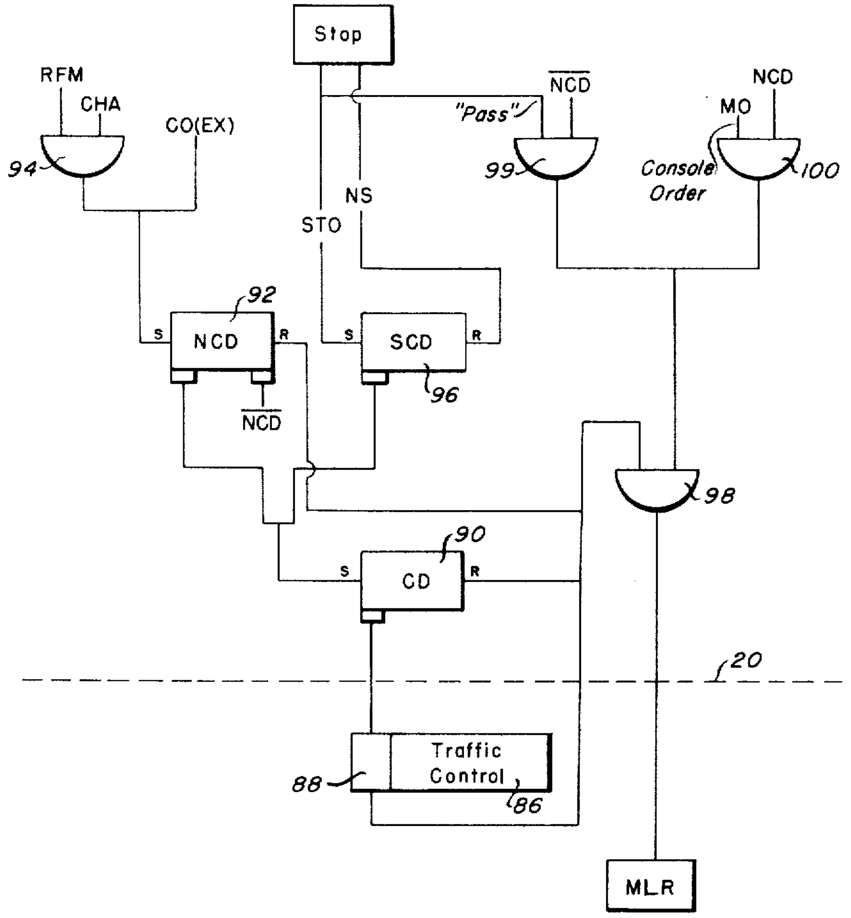
FIGURE 5 illustrates a special type of manual control feature that may be a part of the present invention.

Assuming a central processor of the type incorporating a traffic control is to be used with the present invention, the general logic diagrammatically illustrated in FIGURE 5 may be used to effect a desired coupling between the console and the central processor. Referring to FIGURE 5, it is assumed that the central processor 20 includes, in addition to the equipment referred to in FIGURE 3, a traffic control indicated at 86. This traffic control may take the form illustrated and described in the aforementioned Schrimpf application. In order for the traffic control to operate, it is necessary that each of the devices coupled thereto have an appropriate demand line which may be activated under certain types of control conditions. The first traffic control position 88 of the traffic control is assumed to receive a demand line signal in accordance with the state of a console demand flip-flop 90. The setting of the console demand flip-flop may be under the control of any condition which indicates that a console requires of the central processor a certain type of operation. Thus, when a control order has been set up within the console and the "EXECUTE" switch is operated, a further bistable flip-flop 92 may be switched to the set state. The circuit 92 may also be switched to the set state by a key stroke signal occurring and producing the CHA signal under a condition when the RFM signal is present so that the set signal may be passed through the gate 94 to the set line of the flip-flop 92.

The operation of the stop switch at the console is also effective to activate the console demand flip-flop 90. In order to effect this operation, a store console demand flip-flop 96 is provided. This latter flip-flop will be switched to the set state upon the occurrence of a stop signal STO and will be reset when the stop switch is opened and produces the NS signal. The operation of the stop switch will also be effective to open a gate 98 by way of a further gate 99 having an input indicating no normal console demand $\overline{\text{NCD}}$, under a console demand condition so that a special control order, a "pass order," may be inserted into the memory local register MLR of the central processor for purposes of execution by the central processor. A further gate 100 will serve to provide a means to load a console order into the memory local register by way of the gate 98.

In considering the operation of the apparatus shown in FIGURE 5, reference should be made to the operations described above in connection with FIGURE 4. Thus, for example, under conditions when data is being inserted into the console memory location in the main memory, the RFM flip-flop in FIGURE 3 will be in the set state so that there will be the RFM output. With each valid key stroke made, the signal CHA will be produced and, consequently, the gate 94 will open in FIGURE 5 to pass a signal to the set side of the flip-flop 92. The circuit will switch to the set state and will apply a set signal to the console demand flip-flop 90. With the console demand flip-flop active, this will cause the demand signal to be applied to the traffic control 86 so that upon the occurrence of the next operation which picks up the section 88 of the traffic control circuit, a console demand signal will be effected to lock the traffic control circuit on that demand line in order to perform the order then in control of the central processor. In the case of each character coming in, this will involve a transfer type order which will be effective to combine the incoming data signal to the data already stored within the console memory location.

In the event that the console order is one which has been completed insofar as the typing is concerned at the console keyboard, the execute indicator 70, in FIGURE 3, will be operative and the operator may then actuate the execute switch which will also be effective to set the flip-flop NCD as well as the console demand flip-flop 90. This will again put the console in control of the central processor 20 and the order to be performed will be that order which is inserted into the memory local register by way of the manual order circuit 50, the format storage circuit 58, and the address circuits 64 and 65. When the order is completed, the flip-flops 90 and 92 will be reset by the traffic control section 88.

In the event that the stop switch at the console is operated, the STO signal will set the store console demand flip-flop 96. This will, in turn, set the console demand flip-flop 90. In this instance, the console demand flip-flop 90 will not be reset due to the continued application thereof of the set signal from the flip-flop 96. There will be transferred to the memory local register by way of gates 99 and 98 a special order for stopping the operation of the central processor. This order, in one embodiment, comprised a "pass" order which the system continued to perform until such time as the stop was released. The effect of this pass order is to tie the system up in performing this order and to prevent the console demand from being reset so that the traffic control cannot switch to operate in conjunction with any other device. As soon as the stop switch is released by the operator, the signal STO will go down and the signal NS will come up to reset the store console demand flip-flop 96.

If the console stop switch has been operated to effectively tie up the central processor, it is desirable that an operator be able to perform certain orders by way of the console. This he may do by typing the normal order data and then striking the execute switch. At this time, the NCD flip-flop 92 is switched to the set state. This will close the gate 99 and the pass order cannot be loaded into the memory local register MLR. The console order will come in by way of the gates 100 and 98. When the order has been performed, the flip-flop 92 will be reset so that once again the stop order will act by way of gates 99 and 98 to feed a pass order to the memory local register MLR.

It will be readily apparent that the teachings of the present invention described above may be applied to a number of additional orders and control functions normally associated with console operation of a data processing system. The principles of verified data printing, character selection validation, and the like, may all be utilized in the manner described above.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A control apparatus for a data processor comprising a manually operable keyboard having a plurality of separate character selection keys, order data storage means, format data storage means, key operation sequence indicating means, a plurality of digital gating means connected between said keyboard and each of said storage means, means connecting said key operation sequence indicating means to a first one of said gating means to selectively pass to said order data storage means only those characters selected by a first key operation which selects a character having a predetermined signal combination representing an order to be performed, and means connecting said key operation sequence indicating means to a second one of said gating means to selectively pass to said format data storage means only those characters selected by a second key operation which selects a character having a predetermined signal combination representing a preselected format code.

2. Control apparatus for a data processing system, a manually operable typewriter keyboard having a keyboard configuration containing a plurality of separate alpha-numeric selection keys, an encoder connected to be activated by said selection keys and adapted to produce an output digital code, a plurality of data storage registers, one of which is a control order storage register, a second of which is a digital format storage register and a third of which is an address storage register, key stroke sequence sensing means, means including said sequence sensing means for gating said output digital code of said encoder corresponding to a first selected key operation on said keyboard into said control order storage register, means including said sequence sensing means for gating said output digital code of said encoder corresponding to a second selected key operation on said keyboard into said format register, means including said sequence sensing means for gating said output digital code of said encoder corresponding to a third selected key operation on said keyboard into said address storage register, a character-at-a-time printer, a digital decoder, means including said decoder coupling said control order storage means, said format register and said address register to said printer to print the key selected order character immediately after the operation of any one of said keys.

3. In a data processing system, the combination comprising a control console including a control keyboard having a plurality of selection keys capable of performing a dual function of control and informational data input, a data cancel control means, a first storage means coupled to said keyboard and adapted to store control data selected by said selection keys, a second storage means coupled to said keyboard and adapted to store informational data selected by said selection keys, means indicative of the loading of control and information data into said first and second storage means, and means including said last-named means selectively coupling said cancel control means to said first or second storage means so that, when actuated, said cancel control means will render ineffective only that data in the storage means which last received input data from said selection keys.

4. Control apparatus for a data processing system comprising a control and data keyboard having a plurality of selection keys capable of performing a dual function of control and informational data input, data format control means connected to be activated in accordance with control data generated upon the actuation of one of said selection keys, said format control means being adapted to effect octal coding, hexadecimal coding, or alphanumeric coding in accordance with the nature of the key selected on said keyboard, an execute control means for indicating completion of a data encoding operation directed by said format control means, means including said selection keys and said format control means connected to activate selectively said execute control means when a predetermined number of said keys have been actuated.

5. Control apparatus for a data processing system, a manually operable typewriter keyboard having a keyboard configuration containing a plurality of separate alpha-numeric selection keys, an encoder connected to be activated by said selection keys and adapted to produce an output digital code, a plurality of data storage registers, one of which is a control order storage register, a second of which is a digital format storage register, key stroke sequence sensing means, means including said sequence sensing means for gating said output digital code of said encoder corresponding to a selected key operation on said keyboard into said control order storage register, means including said sequence sensing means for gating said output digital code of said encoder corresponding to a further selected key operating on said keyboard into said format storage register, a character-at-a-time printer, a digital decoder, means including said decoder coupling said control order storage means and said format storage means to said printer to print the order character and format character keys selected at said keyboard immediately after the operation of each of said keys.

6. In a data processing system, the combination comprising a control console including a control keyboard having a plurality of separate selection keys, said selection keys being adapted to perform a dual function of control data and informational data input, a data cancel control means, a first storage means coupled to said keyboard and adapted to store control data selected by said selection keys, a second storage means coupled to said keyboard and adapted to store informational data selected by said selection keys, means indicative of the loading of control and information data into said first and second storage means, means including said last-named means selectively coupling said cancel control means to said first or second storage means so that, when actuated, said cancel control means will render ineffective only that data in the storage means which last received input data from said selection keys, and means activated by said cancel control means when actuated a second time in a sequence connected to render ineffective the data in said first storage means when the first actuation of said cancel control means rendered ineffective the data in said second storage means.

7. Control apparatus for a data processing system comprising a control and informational data keyboard having a plurality of separate selection keys, each of said selection keys being adapted to effect both control and informational data input, an encoder connected to said selection keyboard, data format control means connected to be activated in accordance with control data generated from one of said selection keys when activated, said format control means effecting a multi-bit digital encoding of the data selected by said selection keys, means for indicating that a predetermined number of data bits have been encoded, means including said last-named means conditioning said control apparatus to perform a data processing operation, and a manual control connected to said control keyboard and said conditioning means to transfer the data bits to a selected designation in said data processing system.

References Cited by the Examiner

UNITED STATES PATENTS

| | | | |
|---|---|---|---|
| 2,379,862 | 7/1945 | Bush | 197—84.1 |
| 2,679,638 | 5/1954 | Bensky et al. | 340—172.5 |
| 2,700,755 | 1/1955 | Burkhart | 340—172.5 |
| 2,714,843 | 8/1955 | Hooven | 340—172.5 |
| 2,788,878 | 4/1957 | Gould | 197—19 |
| 2,827,623 | 3/1958 | Ainsworth | 340—172.52 |
| 2,857,100 | 10/1958 | Franck et al. | 340—149 |
| 2,871,289 | 1/1959 | Cox et al. | 340—149 |
| 2,954,860 | 10/1960 | Woodhead | 197—19 |
| 2,995,729 | 8/1961 | Steele | 340—172.5 |
| 3,000,555 | 9/1961 | Innes | 340—172.5 |
| 3,032,746 | 5/1962 | Kautz | 340—172.5 |
| 3,047,228 | 7/1962 | Bauer et al. | 340—172.5 |
| 3,053,449 | 9/1962 | Hoberg et al. | 340—172.5 |
| 3,096,508 | 7/1963 | Reitfort | 340—172.5 |

ROBERT C. BAILEY, *Primary Examiner.*

MALCOLM A. MORRISON, ROBERT A. LEIGHY, *Examiners.*